US012602137B2

(12) United States Patent
He et al.

(10) Patent No.: US 12,602,137 B2
(45) Date of Patent: Apr. 14, 2026

(54) TOUCH DISPLAY PANEL

(71) Applicant: Wuhan China Star Optoelectronics Semiconductor Display Technology Co., Ltd., Wuhan (CN)

(72) Inventors: Ruiting He, Wuhan (CN); Shaojing Wu, Wuhan (CN); Jin Liu, Wuhan (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 0 days.

(21) Appl. No.: 17/792,439

(22) PCT Filed: Jun. 30, 2022

(86) PCT No.: PCT/CN2022/102865
§ 371 (c)(1),
(2) Date: Feb. 6, 2025

(87) PCT Pub. No.: WO2023/236288
PCT Pub. Date: Dec. 14, 2023

(65) Prior Publication Data
US 2025/0181196 A1      Jun. 5, 2025

(30) Foreign Application Priority Data
Jun. 8, 2022     (CN) .......................... 202210646229.7

(51) Int. Cl.
*G06F 3/044*              (2006.01)
(52) U.S. Cl.
CPC .......... *G06F 3/0446* (2019.05); *G06F 3/0445* (2019.05); *G06F 2203/04102* (2013.01)

(58) Field of Classification Search
CPC .. G06F 3/0446; G06F 3/04164; G06F 3/0443; G06F 3/041; G06F 3/0445; G06F 2203/04102
See application file for complete search history.

(56) References Cited

U.S. PATENT DOCUMENTS

2019/0339816 A1* 11/2019 Hsu ........................ G06F 3/0446

FOREIGN PATENT DOCUMENTS

| CN | 206133510 U | 4/2017 |
| CN | 106951125 A | 7/2017 |

(Continued)

OTHER PUBLICATIONS

International Search Report in International application No. PCT/CN2022/102865,mailed on Dec. 16, 2022.

(Continued)

*Primary Examiner* — Deeprose Subedi
(74) *Attorney, Agent, or Firm* — Nathan & Associates; Menachem Nathan

(57) ABSTRACT

A touch display panel includes a touch area and a bezel area. The touch display panel includes a substrate and a touch layer. The touch layer includes a plurality of touch electrodes and a plurality of touch lines. The touch lines include winding sections and main line sections. The touch lines include a first touch line and a second touch line, a width variation between the first touch line and the second touch line in the bezel area is less than or equal to a first preset threshold, and a length of a winding section of the first touch line is less than a length of a winding section of the second touch line.

19 Claims, 6 Drawing Sheets

(56) References Cited

FOREIGN PATENT DOCUMENTS

| CN | 109753182 | A | 5/2019 |
|----|-----------|---|--------|
| CN | 113296632 | A | 8/2021 |
| WO | 2021159299 | A1 | 8/2021 |

OTHER PUBLICATIONS

Written Opinion of the International Search Authority in International application No. PCT/CN2022/102865,mailed on Dec. 16, 2022.

* cited by examiner

TOUCH DISPLAY PANEL

FIELD OF INVENTION

The present disclosure relates to the field of display technologies, and more particularly, to a touch display panel.

BACKGROUND OF INVENTION

Due to rapid development of the level of display technologies, the use of touch display screens is becoming wider and wider. At present, touch technologies involved in the touch display screens are mainly divided into self-capacitive touch and mutual-capacitive touch.

However, in mutual-capacitive touch display panels of current technology, there are differences in signals between touch electrodes at different positions (for example, there are differences in the signals obtained between driving electrodes at different positions, and there are differences in the signals obtained between sense electrodes at different positions), thereby causing touch properties at different positions of a same touch panel to be different.

As shown in FIG. 1, in current touch display panels, a design of touch lines 1 has disadvantages of wide bezels and big resistance differences between wirings. In the existing design, in order to minimize resistance differences between the touch lines 1 to realize an equal resistance design, an adopted method is that an outermost line is the widest, and lines gradually narrow, and a touch line adjacent to a display area AA has a narrowest line width. However, this design method causes a bezel area of the display panels to become larger, which cannot satisfy requirements of narrow bezels.

SUMMARY OF INVENTION

Technical Problem

An embodiment of the present disclosure provides a touch display panel, which can reduce bezels of the touch display panel, thereby realizing a narrow bezel design.

Technical Solution for the Problem

Technical Solution

An embodiment of the present disclosure provides a touch display panel, which has a touch area and a bezel area located on at least one side of the touch area.

The touch display panel includes:
a substrate; and
a touch layer disposed on one side of the substrate, wherein, the touch layer includes a plurality of touch electrodes disposed along a first direction and a second direction in the touch area and a plurality of touch lines at least partially disposed in the bezel area, the touch lines and the touch electrodes are correspondingly connected to each other, and the first direction intersects the second direction;
wherein, the touch lines include winding sections and main line sections connected to each other, one of the winding sections and one of the main line sections are connected to each other by a connection point, and the connection point is an outermost intersection between the touch lines and an extending line of the touch electrodes connected to the touch lines in the second direction; and the touch electrodes include a first touch electrode and a second touch electrode arranged in the first direction, the touch lines include a first touch line and a second touch line, the first touch electrode is electrically connected to the first touch line, the second touch electrode is electrically connected to the second touch line, a width variation between the first touch line and the second touch line in the bezel area is less than or equal to a first preset threshold, and a length of a winding section of the first touch line is less than a length of a winding section of the second touch line.

Optionally, in some embodiments of the present disclosure, a length of a main line section of the first touch line is greater than a length of a main line section of the second touch line.

Optionally, in some embodiments of the present disclosure, the first touch line and the second touch line have a same length.

Optionally, in some embodiments of the present disclosure, the first preset threshold is 20%.

Optionally, in some embodiments of the present disclosure, the first touch line and the second touch line have a same width in the bezel area.

Optionally, in some embodiments of the present disclosure, the touch layer includes first touch electrode groups and second touch electrode groups extending along the second direction, and the first touch electrode groups and the second touch electrode groups are arranged along the first direction;
the first touch electrode groups include a plurality of the touch electrodes arranged and connected along the second direction, one first touch electrode group is connected to the first touch line, and the first touch electrode groups include the first touch electrode; and
the second touch electrode groups include another plurality of the touch electrodes arranged and connected along the second direction, one second touch electrode group is connected to the second touch line, and the second touch electrode groups include the second touch electrode.

Optionally, in some embodiments of the present disclosure, the touch layer further includes third touch electrode groups extending along the first direction, the third touch electrode groups include a plurality of the touch electrodes arranged and connected along the first direction, and each third touch electrode group is connected to one third touch line.

Optionally, in some embodiments of the present disclosure, the main line sections include a first main line section, and the winding sections include a first winding section; and
the first winding section includes at least three first line segments, at least one second line segment, and at least one third line segment, the at least three first line segments are spaced apart from each other along the first direction and extend along the second direction, the at least one second line segment connects a k-th first line segment to a (k+1)th first line segment, and the at least one third line segment connects the (k+1)th first line segment to a (k+2)th first line segment, wherein, k is an integer greater than 0; and the (k+2)th first line segment is connected to the first main line section.

Optionally, in some embodiments of the present disclosure, the main line sections further include a second main line section, and the winding sections further include a second winding section; and
the second winding section includes at least three fourth line segments, at least one fifth line segment, and at least one sixth line segment, the at least one fifth line segment and the at least one sixth line segment extend in the first direction, the at least one fifth line segment connects an m-th fourth line segment to an (m+1)th fourth line segment, and the at least one sixth line segment connects the (m+1)th fourth line segment to an (m+2)th fourth line segment, wherein, m is an integer greater than 0, and the (m+2)th fourth line segment is connected to the second main line section.

Optionally, in some embodiments of the present disclosure, the main line sections further include a third main line section, and the winding sections further include a third winding section; and the third winding section includes at least two seventh line segments and at least one eighth line segment, the at least two seventh line segments are arranged in the first direction, and the at least one eighth line segment extends along the first direction and connects an n-th seventh line segment to an (n+1)th seventh line segment, wherein, n is an integer greater than 0, and the (n+1)th seventh line segment is connected to the third main line section.

Optionally, in some embodiments of the present disclosure, the at least three first line segments are arranged side by side, the at least one fifth line segment and the at least one sixth line segment are arranged side by side, and the at least two seventh line segments are staggered from each other.

Optionally, in some embodiments of the present disclosure, the main line sections further include a fourth main line section, and the winding sections further include a fourth winding section; and the fourth winding section includes at least three ninth line segments, at least one tenth line segment, at least one eleventh line segment, a connecting line segment, at least two twelfth line segments, and at least one thirteenth line segment; the at least three ninth line segments are arranged along the first direction, the at least one tenth line segment connects a g-th ninth line segment to a (g+1)th ninth line segment, the at least one eleventh line segment connects the (g+1)th ninth line segment to a (g+2)th ninth line segment, the at least two twelfth line segments are arranged along the first direction and extend along the second direction, and the at least one thirteenth line segment extends along the first direction, a first end of the connecting line segment is connected to the (g+2)th ninth line segment, a second end of the connecting line segment is connected to an a-th twelfth line segment, and the at least one thirteenth line segment connects the a-th twelfth line segment to an (a+1)th twelfth line segment; and wherein, a is an integer greater than 0, the (a+1)th twelfth line segment is connected to the fourth main line section, and the connecting line segment is a continuous bending structure.

Optionally, in some embodiments of the present disclosure, the touch area includes a first touch area and a second touch area, and the first winding section is connected to the first touch electrode groups and/or the second touch electrode groups on one side of the first touch area away from the second touch area; the second winding section is connected to the first touch electrode groups and/or the second touch electrode groups on one side of the first touch area adjacent to the second touch area; the third winding section is connected to the first touch electrode groups and/or the second touch electrode groups on one side of the second touch area adjacent to the first touch area; and the fourth winding section is connected to the first touch electrode groups and/or the second touch electrode groups on one side of the second touch area away from the first touch area.

Optionally, in some embodiments of the present disclosure, the main line sections include first main line sections, and the winding sections include first winding sections; and the first winding sections include at least two first line segments and at least one second line segment, the at least two first line segments extend along the second direction and are arranged along the first direction, the at least one second line segment connects a k-th first line segment to a (k+1)th first line segment, the (k+1)th first line segment is connected to the first main line sections, and the at least two first line segments are staggered from each other.

Optionally, in some embodiments of the present disclosure, the first touch electrode groups are connected to a part of the first winding sections, and the first winding sections connected to the first touch electrode groups are located on a same side of the bezel area; and the second touch electrode groups are connected to another part of the first winding sections, and the first winding sections connected to the second touch electrode groups are located on another same side of the bezel area.

Optionally, in some embodiments of the present disclosure, each spacing between the main line sections of the first touch line and the second touch line is equal.

Optionally, in some embodiments of the present disclosure, the winding sections are continuous bending structures.

Optionally, in some embodiments of the present disclosure, the bezel area includes first wiring areas and a second wiring area, the first wiring areas are located on opposite sides of the touch area, and the second wiring area is located on another side of the touch area.

Optionally, in some embodiments of the present disclosure, the first touch electrode and the second touch electrode are alternately arranged in sequence along the first direction.

Beneficial Effect of Invention

Beneficial Effect

The embodiments of the present disclosure provide the touch display panel, which has the touch area and the bezel area located on at least one side of the touch area. The touch display panel includes the substrate and the touch layer. The touch layer is disposed on one side of the substrate. The touch layer includes the plurality of touch electrodes disposed along the first direction and the second direction in the touch area and the plurality of touch lines at least partially disposed in the bezel area, and the touch lines and the touch electrodes are correspondingly connected to each other. The first direction intersects the second direction. The touch lines include the winding sections and the main line sections connected to each other, one of the winding sections and one of the main line sections are connected to each other by the connection point. The connection point is the outermost intersection between the touch lines and the extending line of the touch electrodes connected to the touch lines in the second direction. The touch electrodes include the first touch electrode and the second touch electrode arranged in the first direction. The touch lines include the first touch line and the second touch line. The first touch electrode is electrically connected to the first touch line. The second touch electrode is electrically connected to the second touch line. The width variation between the first touch line and the second touch line in the bezel area is less than or equal to the first preset threshold. The length of the winding section of the first touch line is less than the length of the winding section of the second touch line.

In the embodiments, the width variation between the first touch line and the second touch line in the bezel area is less than or equal to the first preset threshold, and the length of the winding section of the first touch line is less than the length of the winding section of the second touch line. Therefore, resistances of the touch lines in the bezel area are the same or basically the same. That is, in the present disclosure, by increasing a length of the touch lines and reducing a line width of the touch lines, the resistances of the touch lines can be the same or basically the same. Further, by bending the winding sections of the touch lines in the bezel area, an occupied space of the touch lines can be reduced, thereby realizing a narrow bezel design of the touch display panel.

BRIEF DESCRIPTION OF DRAWINGS

Description of Drawings

The accompanying figures to be used in the description of embodiments of the present disclosure will be described in brief to more clearly illustrate the technical solutions of the embodiments. The accompanying figures described below are only part of the embodiments of the present disclosure, from which those skilled in the art can derive further figures without making any inventive efforts.

Figure 1:
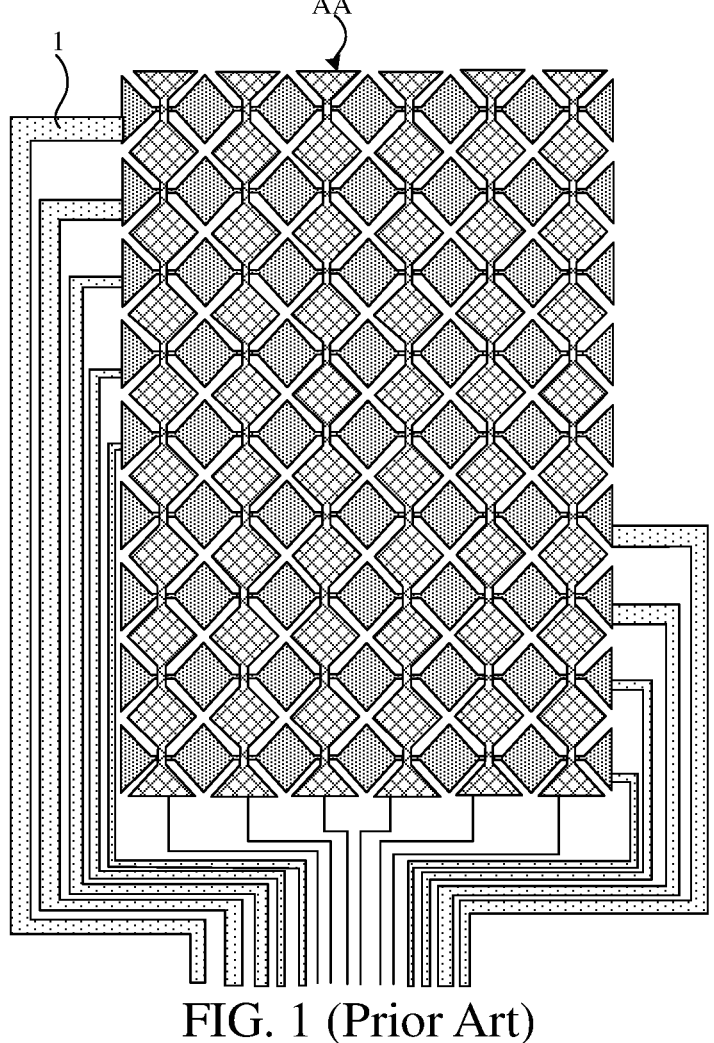

FIG. 1 is a schematic planar diagram of a touch display panel according to a comparative embodiment of the present disclosure.

Figure 2:
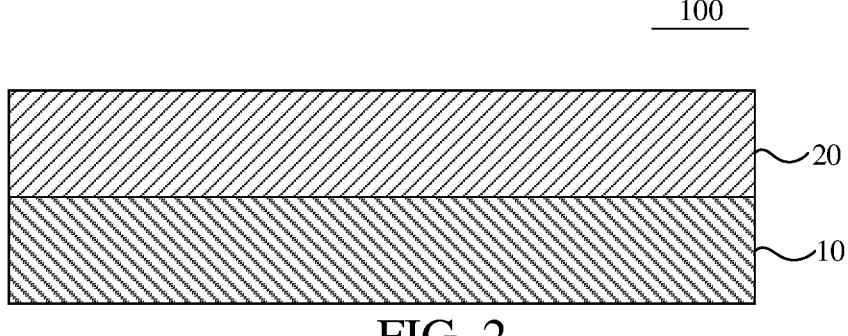

FIG. 2 is a schematic structural diagram of a touch display panel according to an embodiment of the present disclosure.

Figure 3:
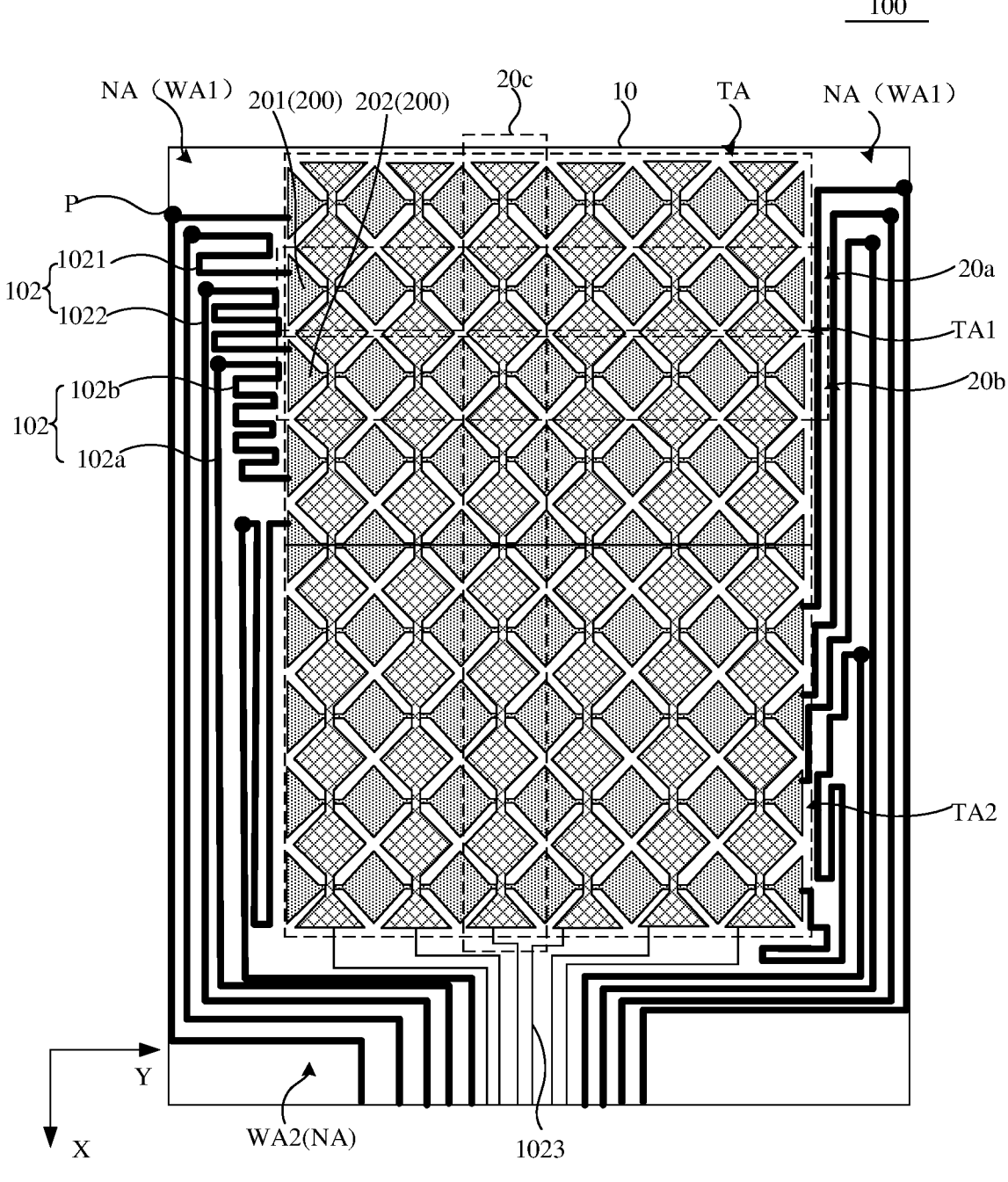

FIG. 3 is a first schematic planar diagram of the touch display panel according to an embodiment of the present disclosure.

Figure 4:
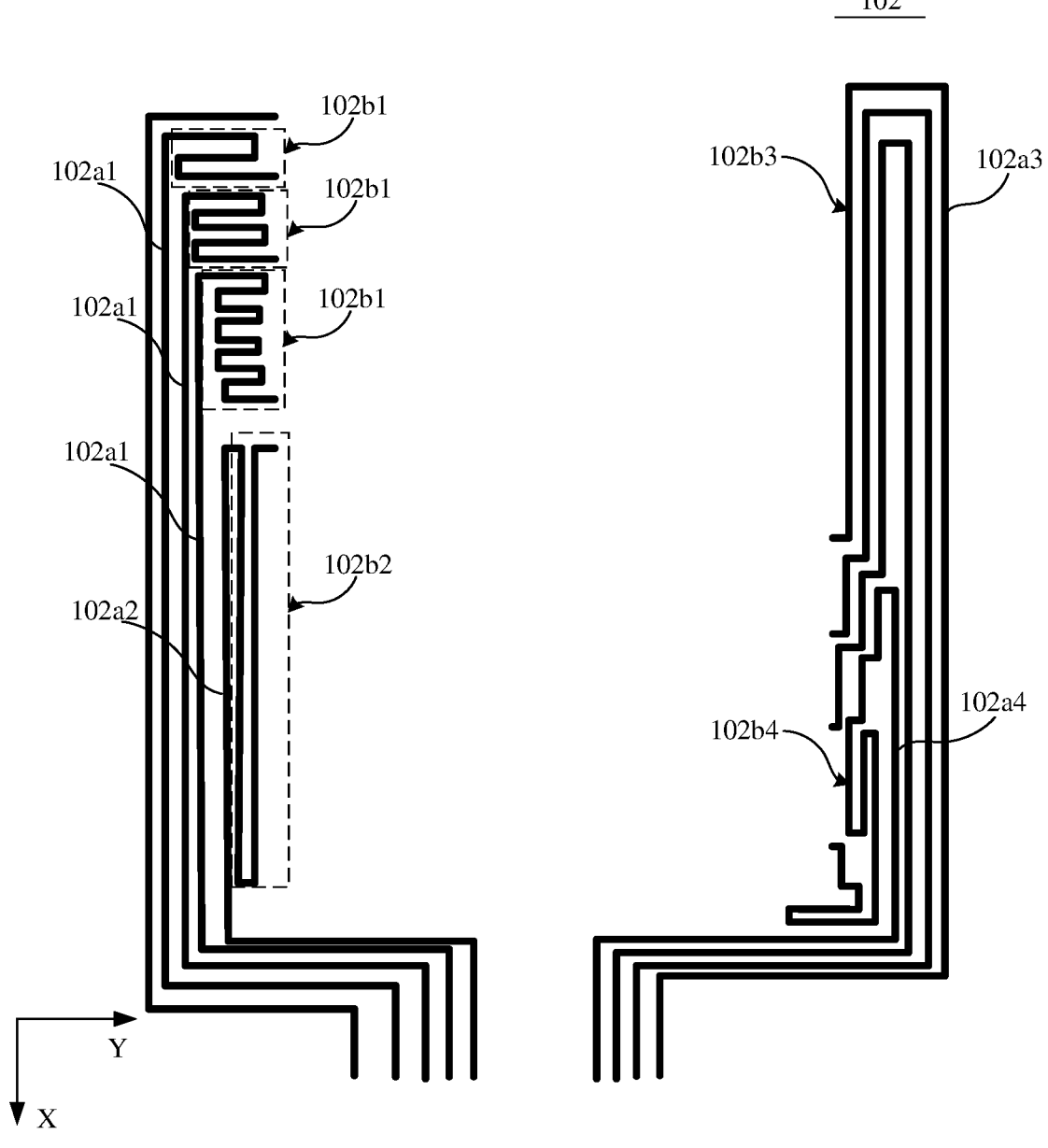

FIG. 4 is a schematic planar diagram of touch lines according to an embodiment of the present disclosure.

Figure 5:
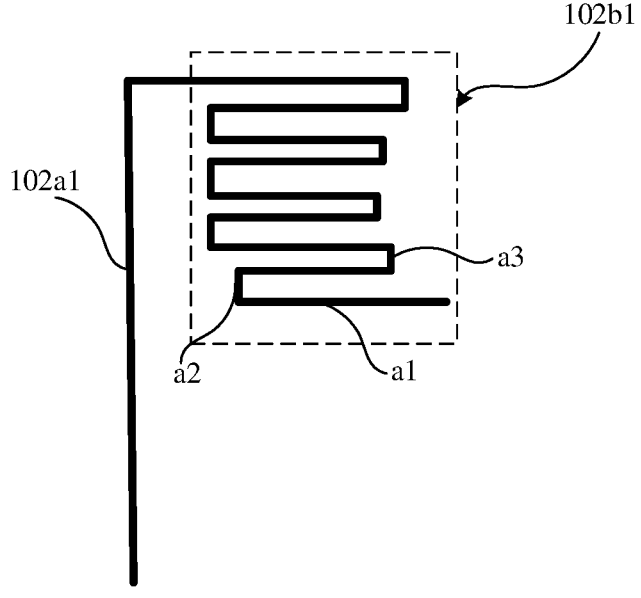

FIG. 5 is a first schematic diagram of the touch lines according to an embodiment of the present disclosure.

Figure 6:
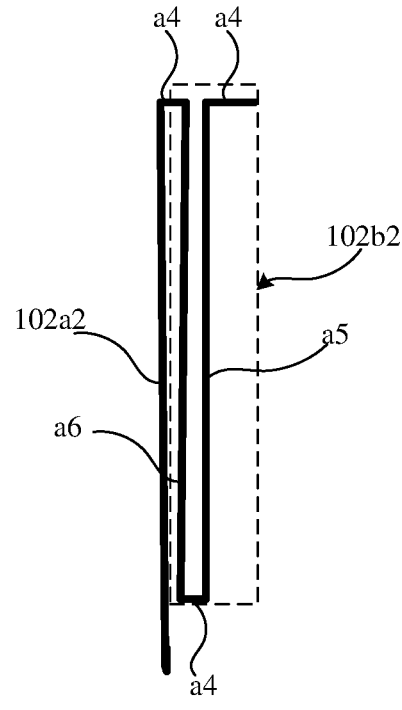

FIG. 6 is a second schematic diagram of the touch lines according to an embodiment of the present disclosure.

Figure 7:
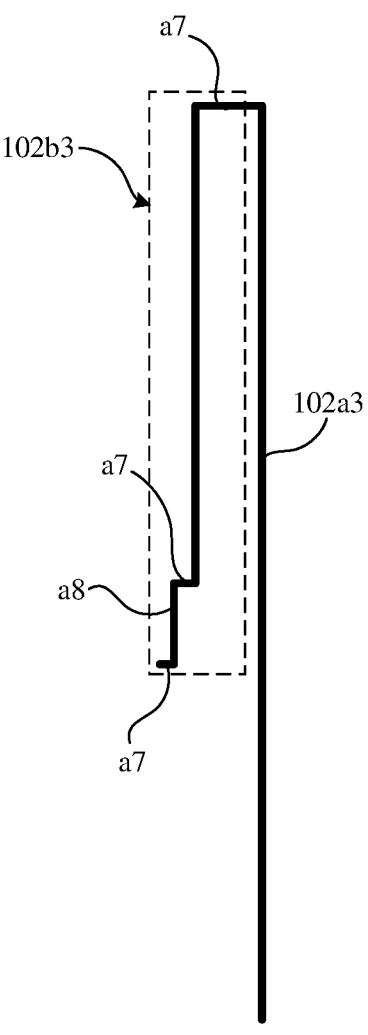

FIG. 7 is a third schematic diagram of the touch lines according to an embodiment of the present disclosure.

Figure 8:
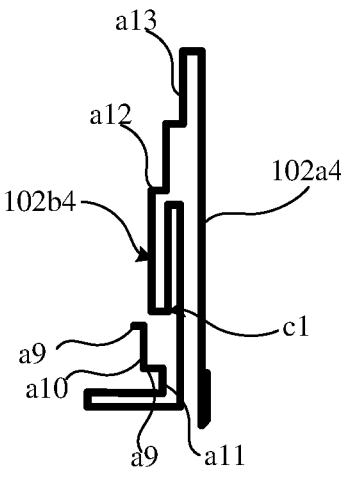

FIG. 8 is a fourth schematic diagram of the touch lines according to an embodiment of the present disclosure.

Figure 9:
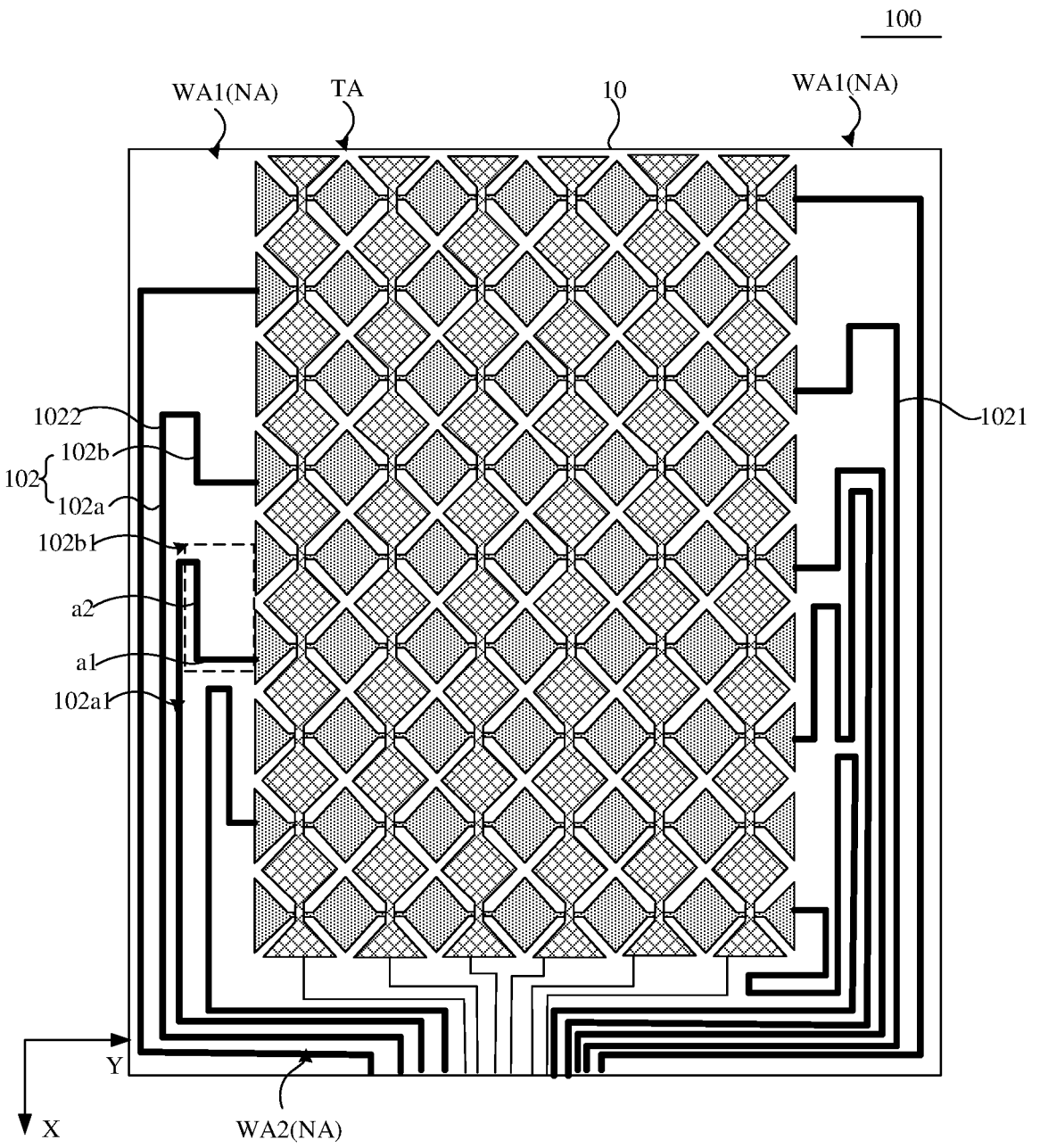

FIG. 9 is a second schematic planar diagram of the touch display panel according to an embodiment of the present disclosure.

DETAILED DESCRIPTION OF EMBODIMENTS OF INVENTION

Embodiments of Invention

In order to make the purpose, technical solutions, and advantages of the present disclosure clearer, the following further describes the present disclosure in detail with reference to the drawings. Please refer to the drawings, in which the same reference numerals represent the same components. The following description is based on the specific embodiments of the present disclosure as illustrated, and should not be considered as limiting other specific embodiments not specifically described herein. As used in this specification, the word "embodiment" means an example, instance, or illustration.

In the description of the present disclosure, it should be understood that terms such as "center", "longitudinal", "lateral", "length", "width", "thickness", "upper", "lower", "front", "rear", "left", "right", "vertical", "horizontal", "top", "bottom", "inside", "outside", "clockwise", "counterclockwise", as well as derivative thereof should be construed to refer to the orientation as described or as shown in the drawings under discussion. These relative terms are for convenience of description, do not require that the present disclosure be constructed or operated in a particular orientation, and shall not be construed as causing limitations to the present disclosure. In addition, terms such as "first" and "second" are used herein for purposes of description and are not intended to indicate or imply relative importance or implicitly indicating the number of technical features indicated. Thus, features limited by "first" and "second" are intended to indicate or imply including one or more than one these features. In the description of the present disclosure, "a plurality of" relates to two or more than two, unless otherwise specified.

The embodiments of the present disclosure provide a touch display panel. It will be described in detail in the following. It should be noted that an order of description in the following embodiments is not meant to limit a preferred order of the embodiments.

The embodiments of the present disclosure provide the touch display panel, which has a touch area and a bezel area located on at least one side of the touch area. The touch display panel includes a substrate and a touch layer. The touch layer is disposed on one side of the substrate. The touch layer includes a plurality of touch electrodes disposed along a first direction and a second direction in the touch area and a plurality of touch lines at least partially disposed in the bezel area, and the touch lines and the touch electrodes are correspondingly connected to each other. The first direction intersects the second direction. The touch lines include winding sections and main line sections connected to each other, one of the winding sections and one of the main line sections are connected to each other by a connection point. The connection point is an outermost intersection between the touch lines and an extending line of the touch electrodes connected to the touch lines in the second direction. The touch electrodes include a first touch electrode and a second touch electrode arranged in the first direction. The touch lines include a first touch line and a second touch line. The first touch electrode is electrically connected to the first touch line. The second touch electrode is electrically connected to the second touch line. A width variation between the first touch line and the second touch line in the bezel area is less than or equal to a first preset threshold. A length of a winding section of the first touch line is less than a length of a winding section of the second touch line.

In the embodiments, the width variation between the first touch line and the second touch line in the bezel area is less than or equal to the first preset threshold, and the length of the winding section of the first touch line is less than the length of the winding section of the second touch line. Therefore, resistances of the touch lines in the bezel area can be the same or basically the same. That is, in the present disclosure, by increasing a length of the touch lines and reducing a line width of the touch lines, the resistances of the touch lines can be the same or basically the same. Further, by bending the winding sections of the touch lines in the bezel area, an occupied space of the touch lines can be reduced, thereby realizing a narrow bezel design of the touch display panel.

The touch display panel of the present disclosure will be described in detail below in conjunction with specific embodiments.

Referring to FIG. 1, FIG. 1 is a schematic planar diagram of a touch display panel according to a comparative embodiment of the present disclosure. In current touch display panels, a design of touch lines 1 has disadvantages of wide bezels and big resistance differences between wirings. As shown in FIG. 1, in the existing design, in order to minimize resistance differences between the touch lines 1 to realize an equal resistance design, an adopted method is that an outermost line is the widest, and lines gradually narrow, and a touch line adjacent to a display area AA has a narrowest line width. However, this design method cannot design wirings having a small resistance and small resistance differences therebetween without increasing a number of wiring film layers under requirements of narrow bezels. Widths of the touch lines being inconsistent is difficult to predict a difference between a design value and an actual value, resulting in the inability to match actual products and design differences, causing great trouble and inaccuracy to the design and manufacturing process.

Referring to FIGS. 2 and 3, FIG. 2 is a schematic structural diagram of the touch display panel according to an embodiment of the present disclosure, and FIG. 3 is a first schematic planar diagram of the touch display panel according to an embodiment of the present disclosure. In order to improve the above design drawbacks, an embodiment of the present disclosure provides the touch display panel. The touch display panel 100 includes a touch area TA and a bezel area NA disposed on at least one side of the touch area TA. The touch display panel 100 includes a substrate 10 and a touch layer 20. The touch layer 20 is disposed on one side of the substrate 10. The touch layer 20 includes a plurality of touch electrodes 200 disposed along a first direction X and a second direction Y in the touch area TA and a plurality of touch lines 102 at least partially disposed in the bezel area NA, and the touch lines 102 and the touch electrodes 200 are correspondingly connected to each other. The first direction X intersects the second direction Y. The touch lines 102 include winding sections 102b and main line sections 102a connected to each other, one of the winding sections 102b and one of the main line sections 102a are connected to each other by a connection point P. The connection point P is the outermost intersection between the touch lines 102 and the extending line of the touch electrodes 200 connected to the touch lines 102 in the second direction Y. The touch electrodes 200 include a first touch electrode 201 and a second touch electrode 202 arranged in the first direction X. The touch lines 102 include a first touch line 1021 and a second touch line 1022. The first touch electrode 201 is electrically connected to the first touch line 1021. The second touch electrode 202 is electrically connected to the second touch line 1022. A width variation between the first touch line 1021 and the second touch line 1022 in the bezel area NA is less than or equal to a first preset threshold. A length of a winding section of the first touch line 1021 is less than a length of a winding section of the second touch line 1022.

In the embodiment, the width variation between the first touch line 1021 and the second touch line 1022 in the bezel area NA is less than or equal to the first preset threshold, and the length of the winding section of the first touch line 1021 is less than the length of the winding section of the second touch line 1022. Therefore, resistances of the touch lines 102 in the bezel area NA can be the same or basically the same. That is, in the present disclosure, by increasing a length of the touch lines 102 and reducing a line width of the touch lines 102, the resistances of the touch lines 102 can be the same or basically the same. Further, by bending the winding sections of the touch lines 102 in the bezel area NA, an occupied space of the touch lines 102 can be reduced, thereby realizing a narrow bezel design of the touch display panel 100.

It should be noted that in the present disclosure, the width variation between the first touch line 1021 and the second touch line 1022 in the bezel area NA refers to a ratio of an absolute value of a width difference between the first touch line 1021 and the second touch line 1022 to a width of the first touch line 1021. That is, for example, if a line width of the first touch line 1021 is a, and a line width of the second touch line is b, then the width variation $X=[(|a-b|)/a]*100\%$.

In some embodiments, the first preset threshold is 20%. Or the first preset threshold may also be one of 18%, 15%, 10%, 8%, 5%, 2%, or 0.

It should be noted that the first preset threshold in the present disclosure is used to prevent process errors.

In some embodiments, a length of a main line section of the first touch line 1021 is greater than a length of a main line section of the second touch line 1022. In the embodiment of the present disclosure, since the length of the winding section of the first touch line 1021 is less than the length of the winding section of the second touch line 1022 and the length of the main line section of the first touch line 1021 is greater than the length of the main line section of the second touch line 1022, a length difference between the first touch line 1021 and the second touch line 1022 is reduced. In addition, since the width variation between the first touch line 1021 and the second touch line 1022 in the bezel area NA is less than or equal to the first preset threshold, the resistance difference between the first touch line 1021 and the second touch line 1022 is reduced. Therefore, problems of signal differences between touch electrode groups at different positions in touch display panels of current technology, thereby causing touch properties at different positions of a same touch panel to be different, can be improved. Wherein, the winding sections 102b are disposed between the main line sections 102a and the touch area TA. That is, the winding sections 102b are defined between the main line sections 102a and the touch area TA, thereby realizing the narrow bezel design of the touch display panel 100.

It should be noted that in the embodiment of the present disclosure, the first touch electrode 201 and the second touch electrode 202 are alternately arranged in sequence along the first direction X.

Referring to FIG. 3, a part of the main line sections 102a extend along the first direction X and are arranged in the second direction Y, and in a direction from the touch area TA to the bezel area NA, a length of the main line sections 102a is gradually increased. Since in the direction from the touch area TA to the bezel area NA, the length of the main line sections 102a is gradually increased, in the first direction X, a length of the winding sections 102b connected to the main line sections 102a is gradually increased.

Specifically, the bezel area NA includes first wiring areas WA1 and a second wiring area WA2, the first wiring areas WA1 are located on opposite sides of the touch area TA, and the second wiring area WA2 is located on another side of the touch area TA. Wherein, the first touch line 1021 and the second touch line 1022 are located in the first wiring areas WA1. The main line sections 102a include a bending part, and the bending part is bent to the second wiring area WA2.

It should be noted that in the present disclosure, the touch display panel 100 may be a self-capacitive touch display panel or a mutual-capacitive touch display panel.

When the touch display panel 100 is the self-capacitive touch display panel, one touch electrode 200 is connected to one touch line 102.

When the touch display panel 100 is the mutual-capacitive touch display panel, the touch layer 20 includes first touch electrode groups 20a and second touch electrode groups 20b extending along the second direction Y, and the first touch electrode groups 20a and the second touch electrode groups 20b are arranged along the first direction X.

Specifically, the first touch electrode groups 20a include a plurality of the touch electrodes 200 arranged and connected along the second direction Y, one first touch electrode group 20a is connected to the first touch line 1021, and the first touch electrode groups 20a include the first touch electrode 201. The second touch electrode groups 20b include another plurality of the touch electrodes 200 arranged and connected along the second direction Y, one second touch electrode group 20b is connected to the second touch line 1022, and the second touch electrode groups 20b include the second touch electrode 202.

It should be noted that in the embodiments of the present disclosure, the first touch electrode groups 20a and the second touch electrode groups 20b are alternately arranged in sequence along the first direction X.

The touch layer 20 further includes third touch electrode groups 20c extending along the first direction X, the third touch electrode groups 20c include a plurality of the touch electrodes 200 arranged and connected along the first direction X, and each third touch electrode group 20c is connected to one third touch line. Third touch lines are located in the second wiring area WA2.

In some embodiments, the first touch electrode groups 20a and the second touch electrode groups 20b are disposed in a same layer, and the third touch electrode groups 20c and the first touch electrode groups 20a are disposed in different layers and insulated from each other.

In some embodiments, the first touch electrode groups 20a and the second touch electrode groups 20b are touch electrode groups, and the third touch electrode groups 20c are sense electrode groups.

In the embodiments of the present disclosure, the winding sections 102b are continuous bending structures, thereby increasing a length of the winding sections 102b. Therefore, on the basis that the length of the winding sections 102b can be increased, the wiring space of the first wiring areas WA1 can be reduced, thereby realizing the narrow bezel design of the touch display panel.

It should be noted that in the present disclosure, the first direction X is a direction that the touch area TA points to the second wiring area WA2, and the second direction Y is a direction that a first wiring area WA1 points to the touch area TA.

In conjunction with FIGS. 3 and 4, FIG. 4 is a schematic planar diagram of the touch lines according to an embodiment of the present disclosure. Wherein, the main line sections 102a include a first main line section 102a1, a second main line section 102a2, a third main line section 102a3, and a fourth main line section 102a4. The winding sections 102b include a first winding section 102b1, a second winding section 102b2, a third winding section 102b4, and a fourth winding section 102b4.

In some embodiments, the touch area TA includes a first touch area TA1 and a second touch area TA2. The first winding section 102b1 is connected to the first touch electrode groups 20a and/or the second touch electrode groups 20b on one side of the first touch area TA1 away from the second touch area TA2. The first main line section 102a1 is disposed on one side of the bezel area NA away from the touch area TA. The second winding section 102b2 is connected to the first touch electrode groups 20a and/or the second touch electrode groups 20b on one side of the first touch area TA1 adjacent to the second touch area TA2. The second main line section 102a2 is disposed on one side of the bezel area NA adjacent to the touch area TA. The third winding section 102b3 is connected to the first touch electrode groups 20a and/or the second touch electrode groups 20b on one side of the second touch area TA2 adjacent to the first touch area TA1. The third main line section 102a3 is disposed on one side of the bezel area NA away from the touch area TA. The fourth winding section 102b4 is connected to the first touch electrode groups 20a and/or the second touch electrode groups 20b on one side of the second touch area TA2 away from the first touch area TA1. The fourth main line section 102a4 is disposed on one side of the bezel area NA adjacent to the touch area TA.

In conjunction with FIGS. 4 and 5, FIG. 5 is a first schematic diagram of the touch lines according to an embodiment of the present disclosure. Wherein, the first winding section 102b1 includes at least three first line segments a1, at least one second line segment a2, and at least one third line segment a3. The at least three first line segments a1 are spaced apart from each other along the first direction X and extend along the second direction Y, the at least one second line segment a2 connects a k-th first line segment to a (k+1)th first line segment, and the at least one third line segment a3 connects the (k+1)th first line segment to a (k+2)th first line segment. Wherein, k is an integer greater than 0. The (k+2)th first line segment is connected to the first main line section 102a1. Wherein, the at least three first line segments a1 are arranged side by side to reduce the wiring space of the first winding section 102b1, thereby further realizing the narrow bezel design of the touch display panel.

In conjunction with FIGS. 4 and 6, FIG. 6 is a second schematic diagram of the touch lines according to an embodiment of the present disclosure. The second winding section 102b2 includes at least three fourth line segments a4, at least one fifth line segment a5, and at least one sixth line segment a6. The at least one fifth line segment a5 and the at least one sixth line segment a6 extend in the first direction X. The at least one fifth line segment a5 connects an m-th fourth line segment to an (m+1)th fourth line segment, and the at least one sixth line segment a6 connects the (m+1)th fourth line segment to an (m+2)th fourth line segment. Wherein, m is an integer greater than 0, and the (m+2)th fourth line segment is connected to the second main line section 102a2. Wherein, the at least one fifth line segment a5 and the at least one sixth line segment a6 are arranged side by side to reduce the wiring space of the second winding section 102b2, thereby further realizing the narrow bezel design of the touch display panel.

In conjunction with FIGS. 4 and 7, FIG. 7 is a third schematic diagram of the touch lines according to an embodiment of the present disclosure. The third winding section 102b3 includes at least two seventh line segments a7 and at least one eighth line segment a8. The at least two seventh line segments a7 are arranged in the first direction X, and the at least one eighth line segment a8 extends along the first direction X and connects an n-th seventh line segment to an (n+1)th seventh line segment. Wherein, n is an integer greater than 0, and the (n+1)th seventh line segment is connected to the third main line section 102a3. The at least two seventh line segments a7 are staggered from each other, and the n-th seventh line segment to the (n+1)th seventh line segment are arranged in a direction away from the touch area TA, thereby extending a length corresponding to the third winding section 102b3.

In conjunction with FIGS. 4 and 8, FIG. 8 is a fourth schematic diagram of the touch lines according to an embodiment of the present disclosure. The fourth winding section 102b4 includes at least three ninth line segments a9, at least one tenth line segment a10, at least one eleventh line segment a11, a connecting line segment c1, at least two twelfth line segments a12, and at least one thirteenth line segment a13. The at least three ninth line segments a9 are arranged along the first direction X, the at least one tenth line segment a10 connects a g-th ninth line segment to a (g+1)th ninth line segment, the at least one eleventh line segment a11 connects the (g+1)th ninth line segment to a (g+2)th ninth line segment, and the at least two twelfth line segments a12 are arranged along the first direction X and extend along the second direction Y. The at least one thirteenth line segment a13 extends along the first direction X. A first end of the connecting line segment c1 is connected to the (g+2)th ninth line segment, a second end of the connecting line segment c1 is connected to an a-th twelfth line segment a12, and the at least one thirteenth line segment a13 connects the a-th twelfth line segment to an (a+1)th twelfth line segment. wherein, a is an integer greater than 0, the (a+1)th twelfth line segment is connected to the fourth main line section 102a4, and the connecting line segment c1 is a continuous bending structure.

In some embodiments, the line widths of the first touch line 1021 and the second touch line 1022 are the same.

Since resistance R=K*line length/line width, (K=resistivity/film thickness), it can be concluded from the formula that an increase of the resistance by reducing the line width and increasing the line length is a multiple of a decrease of the resistance by increasing the line width at a constant line length. Therefore, in the present disclosure, the line width of the touch lines 102 are kept in consistent, and the differences of the line length of the touch lines 102 are minimized, thereby reducing the resistance differences of different touch lines 102. Therefore, the problems of signal differences between touch electrode groups at different positions in touch display panels of current technology, thereby causing touch properties at different positions of a same touch panel to be different, can be improved. In addition, compared with current touch display panels, the width of the touch lines is reduced, and the touch lines are wind, thereby reducing the bezels of the touch display panel and improving the screen utilization of the display panel.

In some embodiments, each spacing between the main line sections of the first touch line 1021 and the second touch line 1022 is equal, thereby preventing two adjacent touch lines from short circuits.

Referring to FIG. 9, FIG. 9 is a second schematic planar diagram of the touch display panel according to an embodiment of the present disclosure. A difference between the touch display panel 100 in this embodiment from the touch display panel 100 in FIG. 3 is that the main line sections 102a include first main line sections 102a1 and second main line sections 102a2. The winding sections 102b include first winding sections 102b1 and second winding sections 102b2. The first touch electrode groups 20a are connected to a part of the first winding sections 102b1, and the first winding sections 102b1 connected to the first touch electrode groups 20a are located on a same side of the bezel area NA. The second touch electrode groups 20b are connected to another part of the first winding sections 102b1, and the first winding sections 102b1 connected to the second touch electrode groups 20b are located on another same side of the bezel area NA. Wherein, each of the first winding sections 102b1 includes at least two first line segments a1 and at least one second line segment a2. The at least two first line segments a1 extend along the second direction Y and are arranged along first direction X. The at least one second line segment connects a k-th first line segment to a (k+1)th first line segment. The (k+1)th first line segment is connected to the first main line sections 102a1. The at least two first line segments a1 are staggered from each other. In this embodiment, the first touch electrode groups 20a are connected to the part of the first winding sections 102b1, and the first winding sections 102b1 connected to the first touch electrode groups 20a are located on the same side of the bezel area NA. The second touch electrode groups 20b are connected to the another part of the first winding sections 102b1, and the first winding sections 102b1 connected to the second touch electrode groups 20b are located on the another same side of the bezel area NA. Therefore, in the first direction X, the first wiring areas WA1 can have sufficient wiring space to accommodate more winding sections 102b.

The present disclosure has been described with preferred embodiments thereof. The preferred embodiments are not intended to limit the present disclosure, and it is understood that many changes and modifications to the described embodiments can be carried out without departing from the scope and the spirit of the disclosure that is intended to be limited only by the appended claims.

What is claimed is:

1. A touch display panel, having a touch area and a bezel area located on at least one side of the touch area and comprising:

a substrate; and a touch layer disposed on one side of the substrate, wherein the touch layer comprises a plurality of touch electrodes disposed along a first direction and a second direction in the touch area and a plurality of touch lines at least partially disposed in the bezel area, the touch lines and the touch electrodes are correspondingly connected to each other, and the first direction intersects the second direction;

wherein the touch lines comprise winding sections and main line sections connected to each other, one of the winding sections and one of the main line sections are connected to each other by a connection point, and the connection point is an outermost intersection between the touch lines and an extending line of the touch electrodes connected to the touch lines in the second direction; and the touch electrodes comprise a first touch electrode and a second touch electrode arranged in the first direction, the touch lines comprise a first touch line and a second touch line, the first touch electrode is electrically connected to the first touch line, the second touch electrode is electrically connected to the second touch line, a width variation between the first touch line and the second touch line in the bezel area is less than or equal to a first preset threshold, and a length of a winding section of the first touch line is less than a length of a winding section of the second touch line;

wherein the main line sections comprise a first main line section, the winding sections comprise a first winding section being serpentine and comprising first U-turn sections connected and arranged along the first direction;

wherein the main line sections further comprise a second main line section, and the winding sections further comprise a second winding section being serpentine and comprising second U-turn sections connected and arranged along the second direction.

2. The touch display panel according to claim 1, wherein a length of a main line section of the first touch line is greater than a length of a main line section of the second touch line.

3. The touch display panel according to claim 2, wherein the first touch line and the second touch line have a same length.

4. The touch display panel according to claim 1, wherein the first preset threshold is 20%.

5. The touch display panel according to claim 4, wherein the first touch line and the second touch line have a same width in the bezel area.

6. The touch display panel according to claim 1, wherein the touch layer comprises first touch electrode groups and second touch electrode groups extending along the second direction, and the first touch electrode groups and the second touch electrode groups are arranged along the first direction;

the first touch electrode groups comprise a plurality of the touch electrodes arranged and connected along the second direction, one first touch electrode group is connected to the first touch line, and the first touch electrode groups comprise the first touch electrode; and the second touch electrode groups comprise another plurality of the touch electrodes arranged and connected along the second direction, one second touch electrode group is connected to the second touch line, and the second touch electrode groups comprise the second touch electrode.

7. The touch display panel according to claim 6, wherein the touch layer further comprises third touch electrode groups extending along the first direction, the third touch electrode groups comprise a plurality of the touch electrodes arranged and connected along the first direction, and each third touch electrode group is connected to one third touch line.

8. The touch display panel according to claim 6, wherein the first winding section comprises at least three first line segments, at least one second line segment, and at least one third line segment, the at least three first line segments are spaced apart from each other along the first direction and extend along the second direction, the at least one second line segment connects a k-th first line segment to a (k+1)th first line segment, and the at least one third line segment connects the (k+1)th first line segment to a (k+2)th first line segment, wherein k is an integer greater than 0; and the (k+2)th first line segment is connected to the first main line section.

9. The touch display panel according to claim 8, wherein the second winding section comprises at least three fourth line segments, at least one fifth line segment, and at least one sixth line segment, the at least one fifth line segment and the at least one sixth line segment extend in the first direction, the at least one fifth line segment connects an m-th fourth line segment to an (m+1)th fourth line segment, and the at least one sixth line segment connects the (m+1)th fourth line segment to an (m+2)th fourth line segment, wherein m is an integer greater than 0, and the (m+2)th fourth line segment is connected to the second main line section.

10. The touch display panel according to claim 9, wherein the main line sections further comprise a third main line section, and the winding sections further comprise a third winding section; and the third winding section comprises at least two seventh line segments and at least one eighth line segment, the at least two seventh line segments are arranged in the first direction, and the at least one eighth line segment extends along the first direction and connects an n-th seventh line segment to an (n+1)th seventh line segment, wherein, n is an integer greater than 0, and the (n+1)th seventh line segment is connected to the third main line section.

11. The touch display panel according to claim 10, wherein the at least three first line segments are arranged side by side, the at least one fifth line segment and the at least one sixth line segment are arranged side by side, and the at least two seventh line segments are staggered from each other.

12. The touch display panel according to claim 10, wherein the main line sections further comprise a fourth main line section, and the winding sections further comprise a fourth winding section; and the fourth winding section comprises at least three ninth line segments, at least one tenth line segment, at least one eleventh line segment, a connecting line segment, at least two twelfth line segments, and at least one thirteenth line segment; the at least three ninth line segments are arranged along the first direction, the at least one tenth line segment connects a g-th ninth line segment to a (g+1)th ninth line segment, the at least one eleventh line segment connects the (g+1)th ninth line segment to a (g+2)th ninth line segment, the at least two twelfth line segments are arranged along the first direction and extend along the second direction, and the at least one thirteenth line segment extends along the first direction, a first end of the connecting line segment is connected to the (g+2)th ninth line segment, a second end of the connecting line segment is connected to an a-th twelfth line segment, and the at least one thirteenth line segment connects the a-th twelfth line segment to an (a+1)th twelfth line segment; and wherein a is an integer greater than 0, the (a+1)th twelfth line segment is connected to the fourth main line section, and the connecting line segment is a continuous bending structure.

13. The touch display panel according to claim 12, wherein the touch area comprises a first touch area and a second touch area, and the first winding section is connected to the first touch electrode groups and/or the second touch electrode groups on one side of the first touch area away from the second touch area; the second winding section is connected to the first touch electrode groups and/or the second touch electrode groups on one side of the first touch area adjacent to the second touch area; the third winding section is connected to the first touch electrode groups and/or the second touch electrode groups on one side of the second touch area adjacent to the first touch area; and the fourth winding section is connected to the first touch electrode groups and/or the second touch electrode groups on one side of the second touch area away from the first touch area.

14. The touch display panel according to claim 6, wherein the main line sections comprise first main line sections, and the winding sections comprise first winding sections; and the first winding sections comprise at least two first line segments and at least one second line segment, the at least two first line segments extend along the second direction and are arranged along the first direction, the at least one second line segment connects a k-th first line segment to a (k+1)th first line segment, the (k+1)th first line segment is connected to the first main line sections, and the at least two first line segments are staggered from each other.

15. The touch display panel according to claim 14, wherein the first touch electrode groups are connected to a part of the first winding sections, and the first winding sections connected to the first touch electrode groups are located on a same side of the bezel area; and the second touch electrode groups are connected to another part of the first winding sections, and the first winding sections connected to the second touch electrode groups are located on another same side of the bezel area.

16. The touch display panel according to claim 1, wherein each spacing between the main line sections of the first touch line and the second touch line is equal.

17. The touch display panel according to claim 1, wherein the winding sections are continuous bending structures.

18. The touch display panel according to claim 1, wherein the bezel area comprises first wiring areas and a second wiring area, the first wiring areas are located on opposite sides of the touch area, and the second wiring area is located on another side of the touch area.

19. The touch display panel according to claim 1, wherein the first touch electrode and the second touch electrode are alternately arranged in sequence along the first direction.

* * * * *